United States Patent [19]

Sullivan

[11] 4,261,710
[45] Apr. 14, 1981

[54] TWO-STAGE AIR CLEANER AND METHOD OF PREVENTING CONTAMINATION OF A SAFETY FILTER

[75] Inventor: Bruce M. Sullivan, Burnsville, Minn.

[73] Assignee: Donaldson Company, Inc., Minneapolis, Minn.

[21] Appl. No.: 21,329

[22] Filed: Mar. 16, 1979

Related U.S. Application Data

[63] Continuation of Ser. No. 800,232, May 25, 1977, abandoned.

[51] Int. Cl.³ .................... B01D 45/18; B01D 50/00
[52] U.S. Cl. ........................... 55/96; 55/337; 55/428; 55/482; 55/497; 55/502; 55/507; 277/143; 277/152
[58] Field of Search ............... 55/323, 330, 337, 428, 55/480–483, 492, 493, 497, 498, 502, 503, 506, 507, 509, 521, 529, 96; 210/338, 342, 444, 447, 448, 462, 499 R; 134/8; 285/DIG. 22; 277/143, 152, 165

[56] References Cited

U.S. PATENT DOCUMENTS

| | | | |
|---|---|---|---|
| 3,061,098 | 10/1962 | Breziwski | 209/211 |
| 3,078,650 | 2/1963 | Anderson et al. | 55/337 |
| 3,372,533 | 3/1968 | Rummec | 55/499 |
| 3,429,108 | 2/1969 | Larson | 55/432 |
| 3,458,050 | 7/1969 | Cooper | 210/443 |
| 3,494,114 | 2/1970 | Nelson et al. | 55/482 |
| 3,584,439 | 6/1971 | Gronholz | 55/337 |
| 3,616,617 | 11/1971 | DeGroote | 55/307 |
| 3,745,753 | 7/1973 | Risse | 55/481 |
| 4,006,000 | 2/1977 | Tortorici et al. | 55/337 |
| 4,007,026 | 2/1977 | Groh | 55/502 |
| 4,020,783 | 5/1977 | Anderson et al. | 55/337 |
| 4,135,899 | 1/1979 | Gaver | 55/502 |

FOREIGN PATENT DOCUMENTS

| | | | |
|---|---|---|---|
| 2513426 | 10/1975 | Fed. Rep. of Germany . | |
| 885055 | 9/1943 | France . | |
| 1203124 | 1/1960 | France . | |
| 1278115 | 10/1961 | France | 55/337 |
| 993023 | 10/1964 | France . | |
| 1563990 | 4/1969 | France . | |
| 1569381 | 5/1969 | France . | |
| 2235608 | 1/1975 | France . | |
| 2265436 | 10/1975 | France . | |
| 565265 | 11/1944 | United Kingdom | 55/497 |
| 880743 | 10/1961 | United Kingdom . | |

Primary Examiner—David L. Lacey
Attorney, Agent, or Firm—Merchant, Gould, Smith, Edell, Welter & Schmidt

[57] ABSTRACT

An improved cylindrical two-stage air cleaner in which the overall efficiency of the cleaner is improved by changing the configuration of filtering means therein from a cylindrical one to a conical one, and in which improved structure is included for sealing the cleaner to prevent passage of incoming air to the outlet without being cleaned, and to automatically scrape particulate matter from the inside of the cleaner housing each time a principal filter is changed.

11 Claims, 5 Drawing Figures

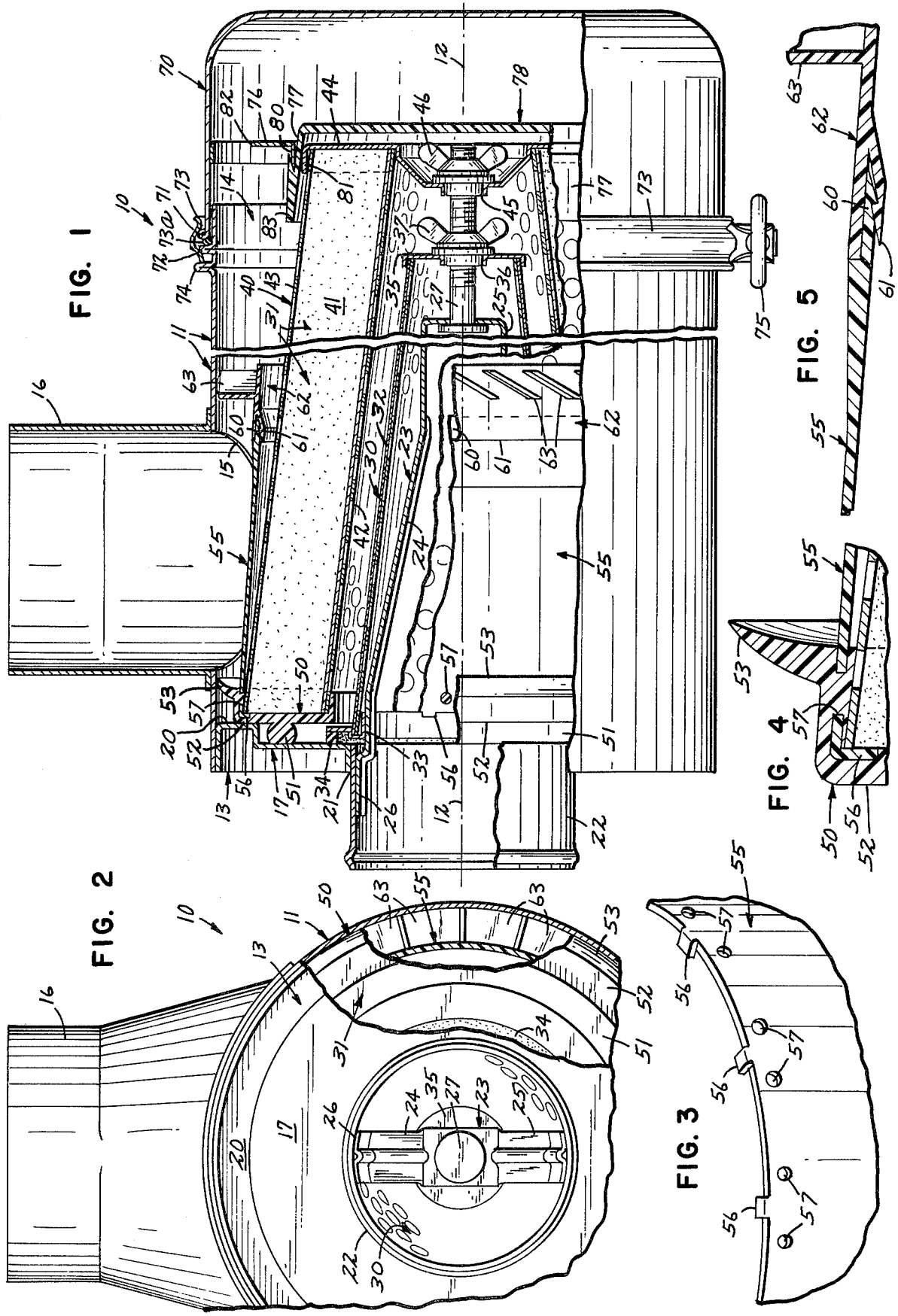

TWO-STAGE AIR CLEANER AND METHOD OF PREVENTING CONTAMINATION OF A SAFETY FILTER

This is a continuation of application Ser. No. 800,232, filed May 25, 1977, now abandoned.

BACKGROUND OF THE INVENTION

This invention relates to the field of air cleaners and particularly to two-stage air cleaners which include a first, centrifugal cleaning stage, for removing larger particles, and a second, filtering stage, in which the filtering means includes an outer, principal filter enclosing an inner, "safety" filter. In such cleaners the principal factor determining the pressure drop across the cleaner is the size of the outlet opening. Since this opening can be no larger than the size of the smallest component of the filtering means, the desired low pressure drop must frequently be achieved at the cost of an increased size of the cleaner as a whole. This factor is further complicated by the fact that the effectiveness of the centrifugal cleaner stage is a function of the volume of air available outside the filtering means and near the collector for larger particles.

SUMMARY OF THE INVENTION

The present invention improves both the pressure drop through the cleaner and the effectiveness of the precleaner, by changing the configuration of the principal and safety filters, making them conical, tapering away from the cleaner outlet opening. This maximizes both the available diameter of the outlet opening, and the volume between the principal filter and the cleaner housing near the particle collector, for any given housing diameter. The arrangement also includes an improved seal between the principal filter and the end of the housing, which improved seal also functions to clean and remove dirt from the housing wall when the filter is serviced.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing,

FIG. 1 is a view in elevation of an air cleaner including the invention, parts being broken away for clarity of illustration;

FIG. 2 is an end view of the same cleaner, parts also being broken away; and

FIGS. 3, 4, and 5 are enlarged fragmentary detailed views of portions of the invention.

DESCRIPTION OF THE PREFERRED EMBODIMENT

In the drawing, an air cleaner 10 is shown to have a housing 11 which is generally cylindrical about an axis 12 extending between a closed end 13 and an open end 14. Housing 11 has a lateral opening 15 near closed end 13, to which is fitted the usual inlet connection member 16. Closed end 13 includes a permanent closure member 17 having an annular inward step 20 and an axial outlet opening 21 with a connection tube 22.

A support yoke 23 has a pair of legs 24 and 25 which diverge to be secured to the inside of tube 22 as shown at 26: the yoke extends along axis 12 and terminates in an axial externally threaded member 27, which serves as the outboard support for filtering means including a safety filter 30 and a principal filter 31.

Safety filter 30 comprises a hollow porous body 32 having a central axis of symmetry coincident with axis 12. Body 32 is not cylindrical but conical: it tapers from a maximum diameter near closure member 17 to a minimum diameter near member 27. The larger end of filter 30 is secured in an annular mounting member 33 having an internal diameter to fit over the legs of yoke 23, and carrying a resilient ring 34 to seal against closure 17 around opening 21. The smaller end of body 30 is secured to a disk 35 which closes the end of the safety filter except for a central aperture 36 to pass member 27 and the shoulder of a wing nut 37 on member 27 which may be tightened to sealingly secure filter 30 coaxially in housing 11.

Principal filter 31 is also conical, tapering from a maximum diameter near closure 17 to a minimum diameter near member 27. Conveniently, the two filters may have the same apex angle. Filter 31 comprises a body 40 made up of pleated paper 41 between inner and outer protecting sheets 42 and 43 having large perforations to transmit air. By reason of the conical configuration the pleats, which lie along lines defined by the intersections with the conical surface of planes passing through axis 12, are more open near the larger end of the filter. At its smaller end body 40 is secured in a disk 44 which closes the filter end except for a central aperture 45 to pass member 27 and the shoulder of a second wing nut 46 on member 27. The larger end of body 40 is molded into an annular mounting member 50 having resilient portions 51 and 52 to engage closure 17 and step 20 respectively. Member 50 also includes an outwardly directed lip 53 which resiliently engages the annular wall of housing 11 for a purpose presently to be described.

In order to prevent direct impingement of the air entering the cleaner at 15 on a porous filter surface, a conical baffle 55 surrounds the portion of body 40 near the larger end thereof. Baffle 55 fits on the end of body 40 before member 50 is molded on, and has lugs 56 to aid in its positioning and apertures 57 to pass the molding compound and ensure a good support. Baffle 55 has a smaller apex angle than body 40, so that air can move axially under the baffle from the right as seen in FIG. 1, and the effective cleaning area of the filter is not materially reduced.

At its end remote from member 50, baffle 55 is configured with a bayonet joint 60 to engage a mating joint 61 in a separately molded fin assembly 62 having a plurality of fins 63 extending angularly with respect to axis 12. The primary purpose of fins 63 is to cause air passing generally axially through them to have a vortical motion: this produces a centrifugal force by reason of which the larger airborne particles move outward to the inner surface of housing 11 and thereafter move helically therearound toward the open end thereof. Fins 63 also serve the secondary purpose of holding filter 31 approximately centered while disk 44 is moved to bring aperture 45 into alignment with member 27. Tightening of wing nut 46 then holds filter 31 coaxially positioned in housing 11.

The open end 14 of housing 11 is closed by removable end cap 70 having a bead 71 around its end. A second bead 72 is formed near the open end of housing 11, and a clamp ring 73 draws bead 72 against an O-ring 73a to hold the cap on the housing, the clamp ring being positioned axially along the housing by a further bead 74, and being tightened by a suitable fastener 75.

Cap 70 includes an annular partition 76, and the rim 77 of an inner cup 78 is sized to fit between an inner lip 80 of partition 76 and the outer rim 81 of disk 44 to prevent flow of air therebetween. A segmental opening 82 is formed in partition 76 near its outer rim to permit particles moving helically along the inside of housing 11 to pass into cap 70 and become trapped. Rim 77 of inner cup 78 is extended axially at 83 over but spaced from a portion of filter 31 to prevent any direct action of air flow through the small end of filter 31 on the movement of particles into trap 70.

OPERATION

In use cleaner 10 is inserted in an air flow line so that air, bearing undesired particulate matter in a range of sizes, can enter the cleaner at 16 and leave it at 22. A safety filter 30 is inserted into the housing over yoke 23, so that its ring 34 seats against end closure 17, and its aperture 36 passes over member 27, and wing nut 37 is tightened. A principal filter 31 is slid into housing 11, lip 53 and fins 63 engaging the inside of the housing, until portions 51 and 52 of member 50 engage closure 17 and step 20, and so that its aperture 45 passes over member 27, and wing nut 46 is tightened. Inner cup 78, which has been removed to permit the emptying of particulate matter out of cap 70, is reinserted into partition 76 in the end cap, and the cap is applied to housing 11, sealing the space at the end of the filtering means, and secured in place by ring 73 and fastener 75. Note that now there is no passage for air from inlet 16 to outlet 22 except through the filters, a double seal being provided at 77-80-81, and a quadruple seal being provided at 11/53, 52/20, 51/17, and 34/17.

The cleaner is now ready to be put into operation, which is done by drawing air through it. Air entering at 16 impinges on baffle 55, so the particles are not driven into any filter surface. The air flows to the right as seen in FIG. 1, being given a circumferential component of motion by fins 63 which causes the larger particles to pass outwardly to housing 11 and flow helically therearound until they reach partition 76 and pass through opening 82 into end cap 70. Air containing smaller particles passes radially through the axially central part of filter 31, and also flows axially under baffle 55 and cup lip 83 so that practically the entire surface of filter 31 is operative. After passing through filter 31 the air passes through filter 32 and thence through outlet tube 22.

When a new filter 31 is in place, little particulate matter reaches filter 30. As the period of use increases the pores in filter 31 become more and more clogged with particulate matter and the pressure drop in the cleaner mounts to an undesirable level. When this occurs, it is necessary to interrupt the air flow through the cleaner, release clamp ring 73, remove end cap 70, remove wing nut 46, and replace filter 31. As the used filter is drawn from the housing lip 53 scrapes from the inner wall any particles which may have accumulated there, and draws them out of the housing. Filter 30 is inspected, and is usually found in satisfactory condition: if not, wing nut 37 is removed and filter 30 is replaced. Note that for the usual case, where filter 30 is satisfactory, the outlet tube 22 is at no time open to the ambient atmosphere but is protected by safety filter 30, hence the name of the latter.

Before reassembling the cleaner inner cup 78 is removed from end cap 70, and the particulate matter which has collected there is emptied out. Reassembly is the reverse of disassembly, starting with the replacement of cup 78 in cap 70 and concluding with tightening of fastener 75 of clamp ring 73 and re-establishing air flow.

From the foregoing it will be clear that I have invented an improved air cleaner wherein minimization of pressure drop and maximization of precleaning efficiency, for any overall housing diameter, are accomplished by constructing the filters with a conical configuration rather than a cylindrical configuration, and wherein improved sealing is provided together with means for automatically cleaning the inner surface of the housing whenever a principal filter is changed.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in the matters of shape, size, and arrangement of parts, within the principle of the invention, to the full extent indicated by the broad general meaning of the terms in which the appended claims are expressed.

What is claimed is:

1. A two-stage air cleaner comprising:
a generally cylindrical housing having an air inlet, an air outlet and removable closure means for gaining internal access to the housing;
a primary filter element disposed in the housing between the air inlet and air outlet and axially removable from the housing with said closure means removed;
a safety filter element disposed in the housing between the air inlet and outlet, with the primary filter element in surrounding relation to the safety filter element;
and means for preventing contamination of the safety filter element when the primary filter element is removed, comprising a resilient lip projecting from the primary filter element in radial engagement with the inner surface of the housing;
whereby any material adhering to the inner housing surface is scraped therefrom by said resilient lip as the primary filter element is axially removed from the housing.

2. A two-stage air cleaner for removing solid particles from a stream of air passing therethrough, comprising:
a housing, generally cylindrical about an axis extending between first and second closed ends thereof, said first end having an annular inward step, the housing having a lateral inlet opening near said first end, an axial outlet opening of less diameter than said housing in said first end, and particle collecting means at said second end;
filtering means in said housing including a hollow body having the shape of a frustum of a circular cone with a larger end directed toward said outlet opening, and of generally the same diameter as said housing, and a smaller end directed away from said outlet opening, said body being of porous paper pleated in alignment with lines defined on said frustum by planes passing through the axis thereof, so that the pleats are more open at said larger end than at said smaller end;

means supporting said filtering means axially in said housing with said larger end surrounding said outlet opening, so that the space between said housing and said filtering means is greater near said second end of said housing than near said first end thereof, including means closing the smaller end of said body and means urging said body toward said first end of said housing;

sealing means including resilient means between said larger end of said body and said first end of said housing, for preventing passage of air through said housing from said inlet opening to said outlet opening except through said filtering means, said sealing means including a resilient annulus connected to the larger end of said filtering means, and having first and second portions severally engaging said first end of said housing and said annular inward step;

and means for imparting to air entering said cleaner at said inlet opening a vortical component of motion around said filtering means and toward said collecting means, and for preventing direct impingement of said entering air on said more open pleats;

all whereby to simultaneously maximize the available size of said outlet opening, so as to reduce the pressure drop in the cleaner, and to maximize the volume of space contained between said housing and said filtering means at the ends thereof remote from said outlet aperture, to optimize reception of particulate matter in said collecting means.

3. A two-stage air cleaner for removing solid particles om a stream of air passing therethrough, comprising:
(a) a housing generally cylindrical about an axis extending between first and second closed ends thereof, the first end having an annular inward step, a lateral inlet opening near the first end, an axial outlet opening of less diameter than said housing in the first end, and particle collecting means at the second end;
(b) filtering means in said housng including a hollow body having the shape of a frustum of a circular cone with a larger end directed toward said outlet opening, and of generally the same diameter as said housing, and a smaller end directed away from said outlet opening, said body being of porous paper pleated in alignment with lines defined on said frustum by planes passing through the axis thereof, so that the pleats are more open at said larger end than at said smaller end;
(c) means supporting said filtering means axially in said housing with said larger end surrounding said outlet opening, so that the space between said housing and said filtering means is greater near said second end of said housing than near said first end thereof, including means closing the smaller end of said body and means urging said body toward said first end of the housing;
(d) sealing means, including resilient means between said larger end of said body and said first end of said housing, for preventing passage of air through said housing from said inlet opening to said outlet opening except through said filtering means, the sealing means further comprising a resilient annulus connected to the larger end of said filtering means and having first and second portions severally engaging the first end of said housing and said step;
(e) means for imparting to air entering said cleaner at said inlet opening a vortical component of motion around said filtering means and toward said collecting means;
(f) and means for preventing direct impingement of said entering air on said more open pleats, comprising an impervious baffle encircling the filtering means and extending axially from said first end to a point intermediate the filtering means;
(g) all whereby to simultaneously maximize the available size of said outlet opening, so as to reduce the pressure drop in said cleaner, and to maximize the volume of space contained between said housing and said filtering means at the ends thereof remote from said outlet aperture, to optimize reception of particulate matter in said collecting means.

4. A two-stage air cleaner according to claim 3 in which said annulus includes a further outwardly extending annular lip for sealing engagement with the inner surface of said housing.

5. A two-stage air cleaner according to claim 3 in which the baffle means comprises a baffle having one end molded into said sealing means at the larger end of said hollow body.

6. A two-stage air cleaner according to claim 3 in which said collecting means includes a cap removable from the end of said housing remote from said outlet opening and extending axially beyond the end of said filtering means, and means providing limited peripheral access to the space within said cap for passage of said solid particles, and preventing air movement across the smaller end of said filter means.

7. A two-stage air cleaner according to claim 3 in which said lateral inlet opening is radially oriented with respect to said axis.

8. The two-stage air cleaner defined by claim 3, wherein the filter means further comprises a safety filter of porous material and having a frustoconical shape, the safety filter disposed within said hollow body with a larger end directed toward and at least as large as said outlet opening but smaller than said larger end of said hollow body, and a smaller end directed away from said outlet opening and smaller than the smaller end of said hollow body; and means supporting said safety filter coaxially within said hollow body.

9. The two-stage air cleaner defined by claim 3, wherein the sealing means further comprises means for occluding the smaller end of the filtering means.

10. A method of preventing contamination of a safety filter in the housing of a two-stage air cleaner having a principal filter surrounding the safety filter which includes sealing means engageable with the inner surface of the housing, the method comprising the step of axially scraping the inner surface of the housing with said sealing means, and axially displacing the matter so removed from said inner surface as an incident to removal of the principal filter.

11. In combination:
(a) a housing of predetermined axis extending between first and second closed ends thereof, the housing having an inlet opening, and an axial outlet opening in said first end, said first end having a peripheral inward step;
(b) a filter element of circular section supported coaxially in the housing, said filter element having an end disposed adjacent the first end of said housing;

and means for sealing the joint between the first end of said housing and said filter element end, comprising (i) a resilient annular sealing member mounted on said filter elements end, said member having a stepped end with the stepped and unstepped portions of said first end, and an annular lip continuously and peripherally engaging the inner surface of the housing;

(c) whereby there are three sequential seals against the passage of air from the housing inlet past said filter element to said outlet, comprising said lip and the complementing stepped ends of said first end and said sealing means.

* * * * *